No. 762,548. PATENTED JUNE 14, 1904.
W. L. MORRIS.
WAD TESTING DEVICE.
APPLICATION FILED MAR. 8, 1901.
NO MODEL. 5 SHEETS—SHEET 1.
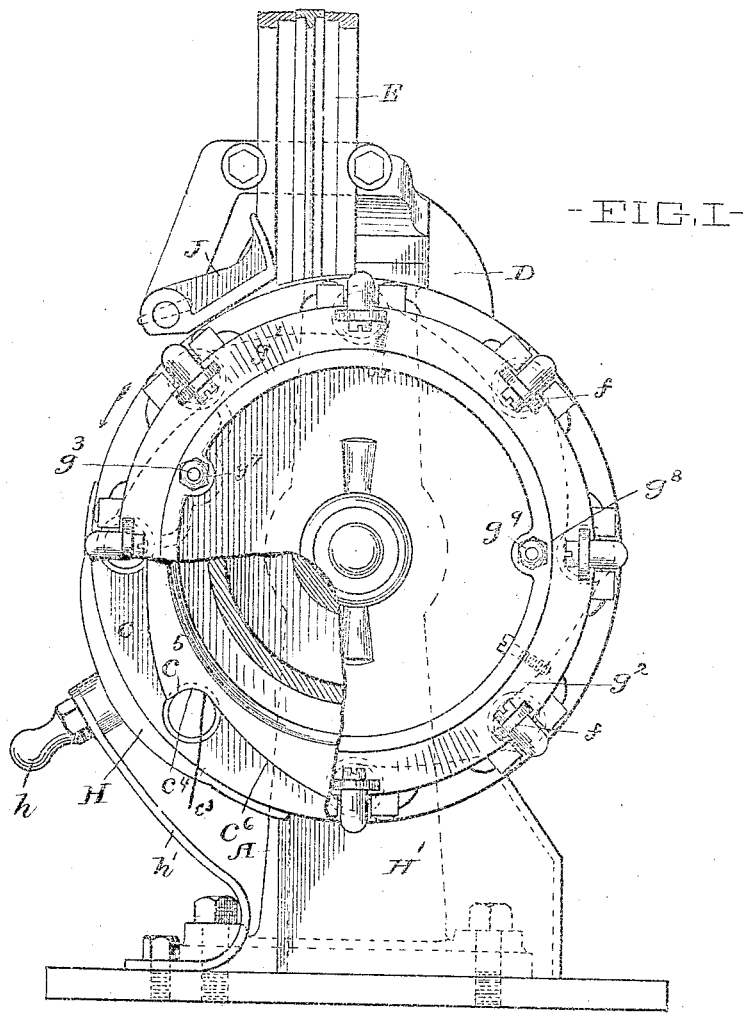
FIG. I.
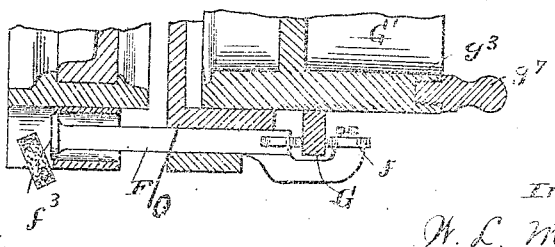
FIG. VII.
Witnesses,
J. C. Turner
W. E. Merkle
Inventor
W. L. Morris
By J. B. Fay
Atty.

No. 762,548. PATENTED JUNE 14, 1904.
W. L. MORRIS.
WAD TESTING DEVICE.
APPLICATION FILED MAR. 9, 1901.
NO MODEL. 5 SHEETS—SHEET 2.
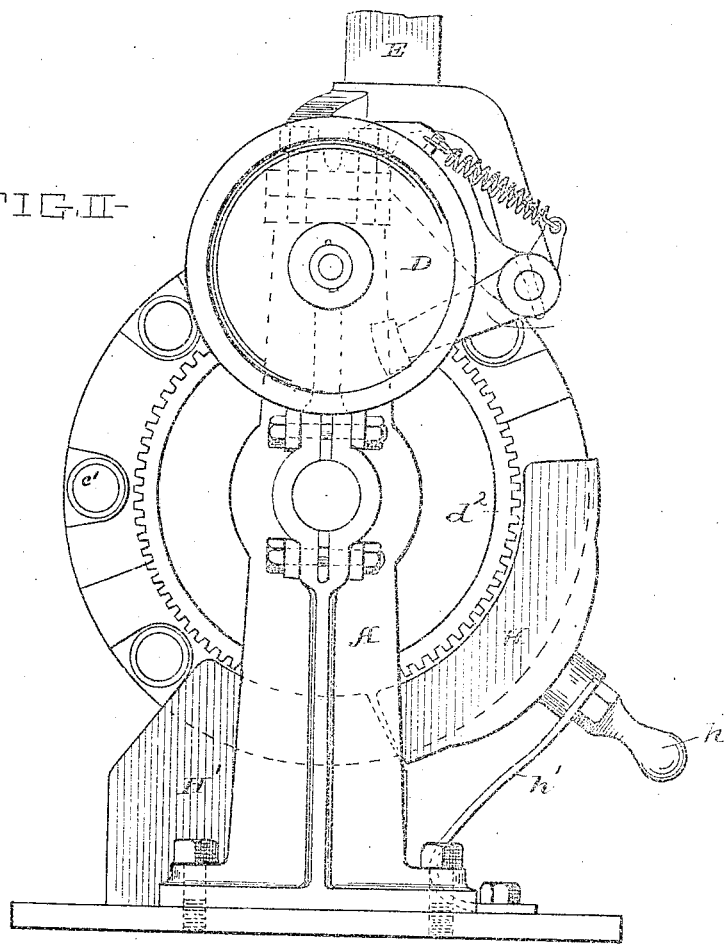
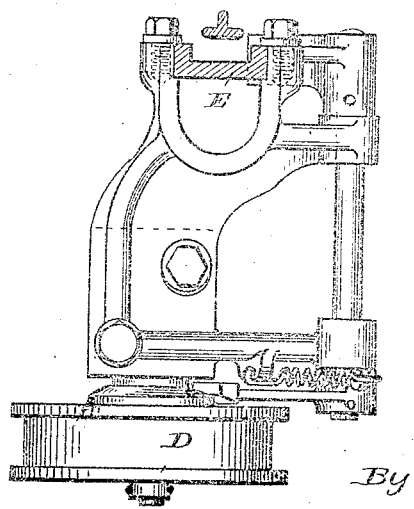

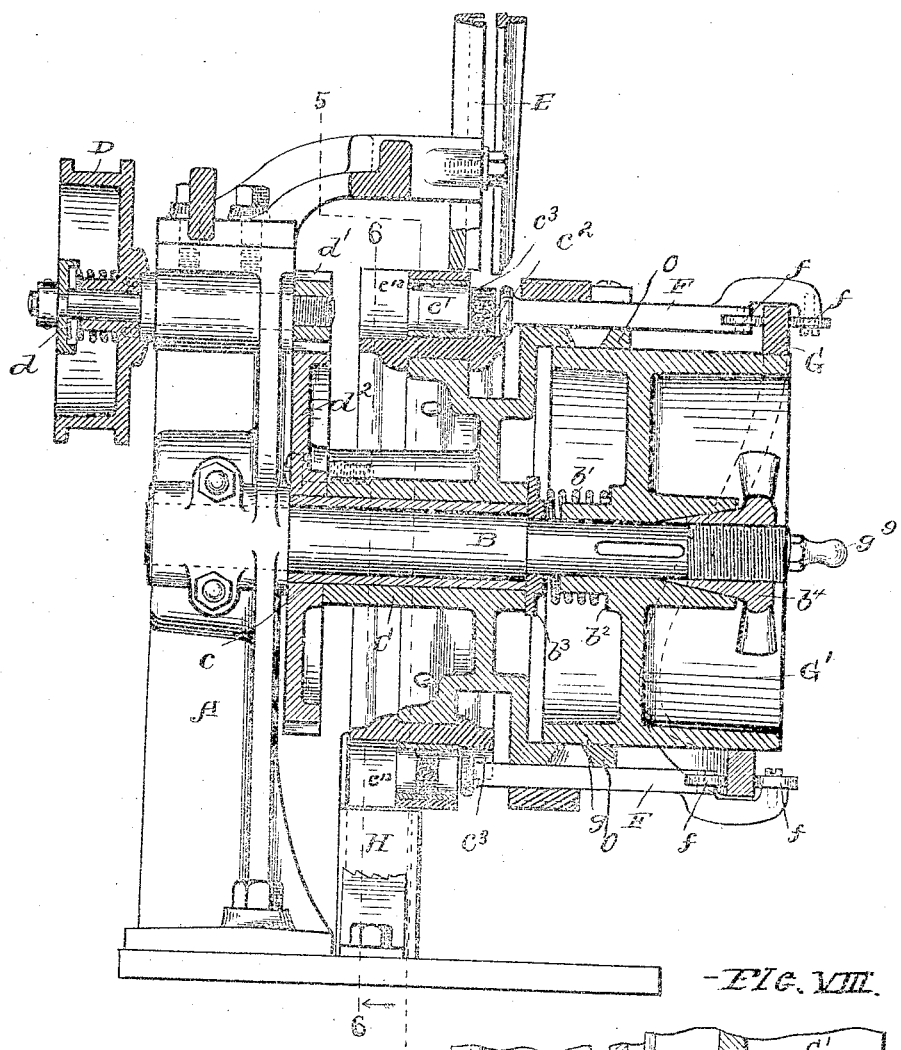

No. 762,548. PATENTED JUNE 14, 1904.
W. L. MORRIS.
WAD TESTING DEVICE.
APPLICATION FILED MAR. 8, 1901.
NO MODEL. 5 SHEETS—SHEET 4.
FIG. V.
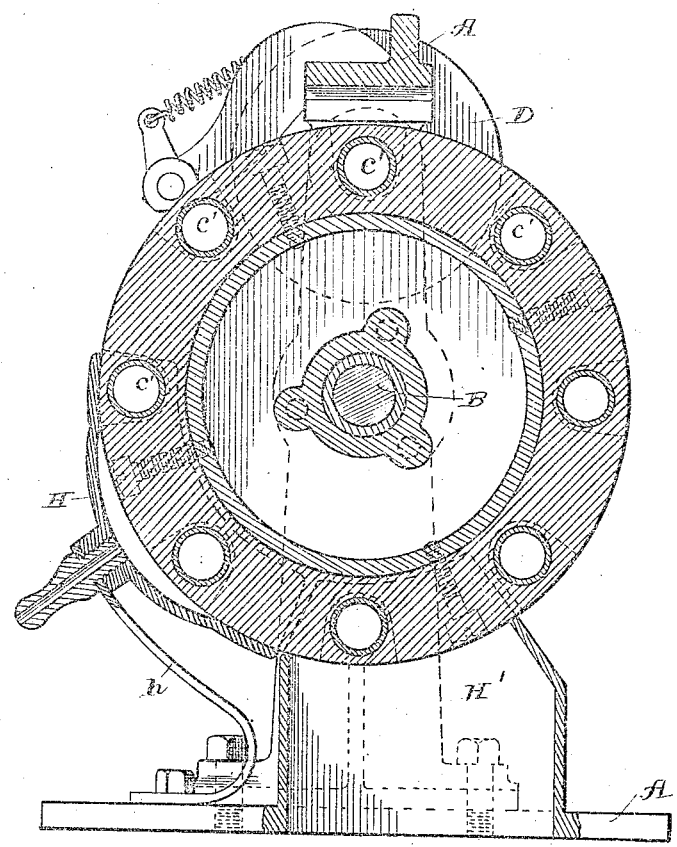

No. 762,548. PATENTED JUNE 14, 1904.
W. L. MORRIS.
WAD TESTING DEVICE.
APPLICATION FILED MAR. 8, 1901.
NO MODEL.
5 SHEETS—SHEET 5.
-FIG.VI-
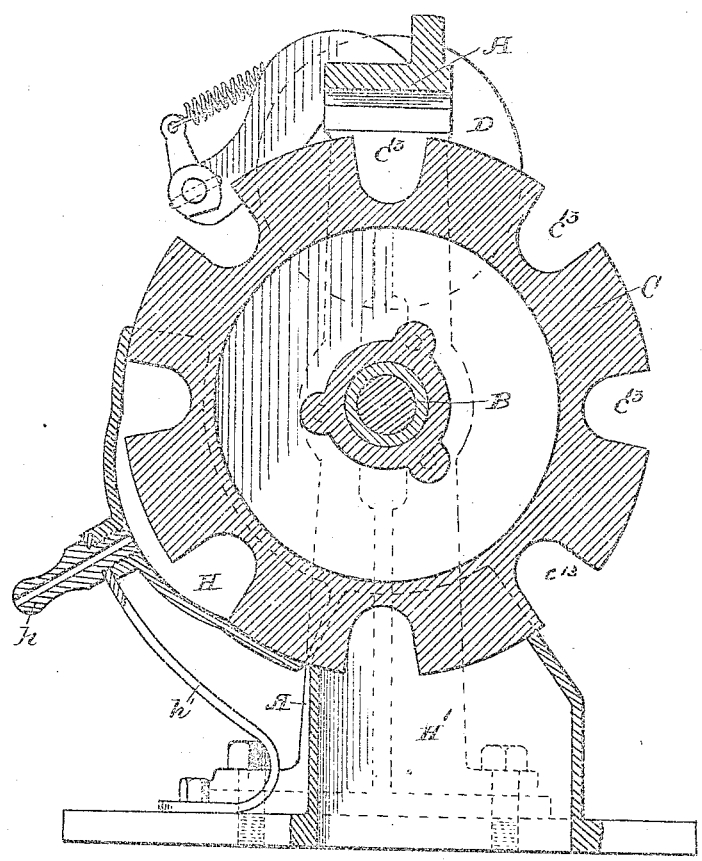

No. 762,548.

Patented June 14, 1904.

UNITED STATES PATENT OFFICE.

WILLIAM L. MORRIS, OF CLEVELAND, OHIO, ASSIGNOR TO THE AUSTIN CARTRIDGE COMPANY, OF CLEVELAND, OHIO, A CORPORATION OF OHIO.

WAD-TESTING DEVICE.

SPECIFICATION forming part of Letters Patent No. 762,548, dated June 14, 1904.

Application filed March 8, 1901. Serial No. 50,341. (No model.)

*To all whom it may concern:*

Be it known that I, WILLIAM L. MORRIS, a citizen of the United States, and a resident of Cleveland, county of Cuyahoga, and State of Ohio, have invented a new and useful Improvement in Wad-Testing Devices, the principle of the invention being herein explained and the best mode in which I have contemplated applying that principle, so as to distinguish it from other inventions.

My invention relates to devices for testing wads used for loading shells in the manufacture of cartridges for the purpose of segregating the imperfect from the perfect wads.

The said invention consists of means hereinafter fully described, and specifically set forth in the claims.

The annexed drawings and the following description set forth in detail certain mechanism embodying the invention, the disclosed means, however, constituting but one of various forms in which the principle of the invention may be used.

In said annexed drawings, Figure I represents a front elevation of a wad-testing machine embodying my invention, illustrating a portion broken away, so as to disclose the construction in the rear of the front face of the machine. Fig. II represents a rear elevation of said machine. Fig. III represents a detail plan view thereof. Fig. IV represents a longitudinal section taken upon a vertical plane passing through the axis of the machine, the frame and supporting-spindle being, however, shown in elevation therein. Fig. V represents a sectional view taken upon the planes indicated by the lines 5 5 in Fig. IV. Fig. VI represents a sectional view taken upon the plane indicated by the lines 6 6 in Fig. IV looking in the direction indicated by the arrow in said figure, and Fig. VII represents a detail sectional view. Fig. VIII is a detail sectional view showing the plunger in a different position.

Upon a frame A is mounted a dead spindle B, upon whose inner portion is secured a bushing $c$, which forms a bearing for a rotatable wad-carrier C. The rotation of said carrier is effected by means of a driving-shaft $d$, upon whose outer end is secured a pinion $d'$, meshing with a driving-gear $d^2$, which is secured to the inner end of the wad-carrier C, as shown in Fig. IV. Arranged in the carrier and with their centers upon the circumference of a circle having a center upon the carrier-axis of rotation—in other words, arranged concentrically with the opening for the shaft B—is a series of equidistant cylindrical wad-testing chambers $c'$, Figs. II and V, such chambers being open at both ends, as shown in Fig. IV. In front of the said testing-chambers is a forwardly-projecting serrated shoulder $c^2$, forming a series of wad-receiving recesses $c^3$, Fig. I, bounded on one side by an abrupt shoulder $c^4$ and upon the other by a gradually-inclined surface $c^6$. As shown in Figs. IV and VII, the wad or testing chambers $c'$ extend but partially across the carrier, the front entrance to the chamber being as above stated, while the discharge-outlet from the chamber at the rear is a continuation of the chamber $c'$, excepting that the rim of the carrier is cut away, as shown in Fig. VI, thereby forming recesses $c^{13}$, from which the wads can readily pass when the face of the carrier is clear of obstructions.

At the upper portion of the machine is secured the discharging extremity of a wad-feeding device E, which may be of any suitable construction, whereby wads may be fed successively to the wad-receiving recesses during their rotation with the carrier.

Mounted so as to be longitudinally slidable in a direction parallel with the axis of rotation of the carrier are a series of ejecting-plungers F, one such plunger being located opposite each wad-testing chamber and wad-recess, as shown in Fig. IV, whereby any one of the latter may be caused to enter into or be withdrawn from its respective testing-chamber, as shown in Fig. VII. The outer end of each plunger is provided with two antifriction-rollers $f \cdot f$, which engage a cam G, which is formed upon or secured to a stationary drum G', Fig. IV. The said drum is mounted upon the reduced end $b$ of the spindle B, and surrounding the rear portion of the hub of said drum is a coiled spring $b'$, one end of which rests against an annular shoulder $b^2$ on the hub, the other end of the spring resting against a collar $b^3$, surrounding the reduced end of the spindle at the rear of the hub, said spring permitting longitudinal movement of the drum when required or desired. The outer portion of the reduced end of the spindle B is screw-threaded to receive an adjusting-nut $b^4$, constituting the means whereby the drum G' may be properly and suitably adjusted with respect to the mechanism coacting therewith, as shown, and forms a guiding-support at $g$ for the outer end of the wad-carrier, which is formed with the cylindrical recess for receiving the inner end of the drum. Said cam is curved at $g'$, so as to effect an inward movement at such point sufficient to cause a wad which may have been placed in the wad-recess opposite the end of a plunger to be inserted into the wad-testing chamber corresponding with such recess. A further curvative is given such cam at $g^2$, Fig. I, such curvative being sufficient to cause the plungers as they pass such point to enter and pass into their corresponding testing-chambers a distance sufficient to positively eject a wad which may have been placed and seated in such chamber, as shown in Fig. VII. At a point $g^3$, Fig. I, in the drum G' is bored an air-duct $g^4$, which communicates with an aperture $g^5$, piercing the outer cylindrical surface of such drum at its inner portion, as shown in said Fig. VIII. In the plane of such aperture $g^5$, perpendicular to the axis of rotation to the carrier, are formed a series of apertures $c^7$, Fig. VIII, said apertures $g^5$ being formed in the outer annular rim or flanged portion O of the wad-carrier C, one such aperture being formed so as to communicate with the inner surface of each plunger F. At such point in such plunger is formed an aperture $f'$, communicating with a longitudinal bore $f^2$, piercing the face $f^3$ of such plunger, as shown in dotted lines in said Fig. VIII. A nipple $g^7$ is secured to the drum and communicates with the duct $g^4$, such nipple being adapted to receive and have secured thereto the end of a flexible rubber tube communicating with any suitable source of pneumatic pressure. At a point $g^8$, Fig. I, is secured a second nipple $g^9$, communicating with an air-duct formed in the drum and communicating with the apertures $c^7$ and the longitudinal bores in the plungers F in a manner similar to that just described at the point $g^3$. The said nipple is also adapted to be connected with a rubber tube (not shown) communicating with a suitable source of air-pressure, whereby a blast of air may be directed into and pass through the testing-chambers as they successively pass this point. Located in advance of the point $g^3$ in the rotation of the carrier, which rotation is as indicated by the arrow in Fig. I, is a vacuum-chamber H, provided with a nipple $h$, to which may be secured a rubber tube, (not shown,) also communicating with any suitable source of vacuum-forming means. Said chamber is so arranged as to embrace and inclose the rear of the testing-chambers as they pass through such vacuum-chamber, as shown in Fig. IV, whereby the pressure of air on the opposite sides of the wad is made unequal and resulting in the forcing of the wad when of proper and perfect form to fit the sides of the testing-chamber from the wad-chamber. The discharge-outlet $c^{13}$, into which the wad passes after being withdrawn from the wad or testing chamber, is placed in communication with a suitable receptacle H' for receiving the discharged wads after the carrier has rotated to a point beyond the vacuum-chamber. Said receptacle is located between the vacuum-chamber and the point $g^2$, as shown in Fig. I. The vacuum-chamber is formed with suitable surfaces for contacting the rotating carrier in an air-tight manner, such contact being maintained by means of a spring $h'$, Figs. I and VI.

The operation of the device as thus far described is as follows: The nipples $g^9$, $g^3$, and $h$ having been suitably connected with their respective pneumatic sources, the wad-carrier is rotated upon its axis by means of the driving-pulley D. Wads are fed from the wad-feeding device E into the wad-recesses as they successively pass beneath the discharge end of said feeding device. Immediately after such feeding the carrier is moved to the point $g'$, where the respective plungers are caused to move inwardly and insert the wads into their respective testing-chambers. Immediately following such action the chambers pass the point $g^3$, at which point a stream of air is projected into the chamber and upon the outer wad-surface, thereby blowing out any refuse matter which may have become lodged therein and which might subsequently interfere with the operation of the device. After passing this point the testing-chambers next are brought into the field of operation of the vacuum-chamber, at which point the reduction of the atmospheric pressure on the inner face of the wads permits the wads when the wad is of sufficiently perfect form to fit the sides of the testing-chamber to be forced therefrom by the greater pressure exerted upon the opposite side of the wad, whereupon the latter is drawn into the discharge-outlet $c^{13}$. As the wads have a diameter greater than the space between the face of the carrier and the opposing face of the vacuum-chamber casing, the wads will be retained in the outlet $c^{13}$, with possibly a rolling contact with the face of the casing, until the carrier has passed to a point where the outlet is in communication with the receptacle H', when the wads drop from the carrier. Where such form is not sufficiently perfect, the air escapes around the sides of the wad or through the same, as the case may be, sufficiently to prevent the reduction of the pressure on the inner side of the wad to a degree such as to permit the wads to remain in such chambers. Perfect wads are hence withdrawn from their testing-chambers at this point and are discharged into the discharge-outlet $c^{13}$, from whence they are precipitated into the receptacle provided for their reception. After passing through the vacuum-chamber the testing-chambers reach the point $g^2$, where the plungers are actuated so as to enter and pass into the wad-testing chambers sufficiently to positively eject any imperfect wads which may have remained therein after passing through the vacuum-chamber, as shown in Fig. VII. Such imperfect wads are hence ejected outside of the discharge-opening H', and hence separated from the perfect wads. At the point $g^3$ all wads, whether perfect or imperfect, have been ejected from the chambers, and a blast of air is projected through the chambers as they successively pass into communication with the air-duct formed at this point, (see Fig. VIII,) so as to clean out such chambers of any refuse which may have remained therein.

The driving-pulley D is provided with clutch mechanism, whereby such pulley may be disconnected from or connected with the driving-shaft, so as to render the mechanism inoperative. Such mechanism is operated by a faulty feeding operation of the wads into the wad-recesses, the operation of such mechanism and a description thereof having, however, been incorporated and claimed in a separate application for Letters Patent filed by me on the 8th day of March, 1901, and bearing Serial No. 50,342, relating to an invention for sorting wads.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a wad-testing machine, the combination of a wad-carrier having a testing-chamber closely fitting the periphery of the wads; means for placing a wad in such chamber; and means for producing unequal pressures upon opposite sides of the wad in such chamber.

2. In a wad-testing machine, the combination of a wad-carrier having a testing-chamber closely fitting the periphery of the wads; means for placing a wad in such chamber; and means for producing unequal pressures on opposite sides of the wad in such chamber, the degree of difference in said pressures being determined by the fit of the wad in the chamber.

3. In a wad-testing machine, the combination of a wad-carrier having a testing-chamber closely fitting the periphery of the wads; means for placing a wad in such chamber; means for producing unequal pressures upon opposite sides of the wad in such chamber; and means for bringing said chamber into operative connection with the unequal-pressure-producing means.

4. In a wad-testing machine, the combination of a wad-carrier having a testing-chamber closely fitting the periphery of the wads; means for placing a wad in such chamber; means for producing unequal fluid-pressures upon opposite sides of the wad in such chamber; and means for moving said chamber from a feeding position to a position to be acted upon by said fluid-pressure-producing means.

5. In a wad-testing machine, the combination of a wad-carrier having a testing-chamber closely fitting the periphery of the wads; means for placing a wad in such chamber; means for producing unequal air-pressures upon opposite sides of the wad in such chamber, said means being located out of alinement with the feeding position of the wad to such chamber; and means for moving said chamber into operative connection with such unequal pressures.

6. In a wad-testing machine, the combination of a wad-carrier having a series of testing-chambers closely fitting the periphery of the wads; means for placing a wad in each chamber successively; means for ejecting the wad from each chamber by differential fluid-pressures operating on opposite sides of the wad, the fit of the wad in its chamber determining the movement of the wad; and additional means for subsequently ejecting such wads as have been rejected by the fluid-pressures.

7. In a wad-testing machine, the combination of a wad-carrier having a series of testing-chambers closely fitting the periphery of the wads; means for successively placing a wad in each chamber; means for ejecting the wad from each chamber by differential fluid-pressures operating on opposite sides of the wads, the fit of the wad in its chamber determining the movement of the wad; and a series of plungers carried by the carrier and movable to subsequently eject such wads as have been rejected by the fluid-pressures.

8. In a wad-testing device, the combination of a wad-carrier having a series of testing-chambers, a series of plungers mounted upon the latter opposite said chambers, means for feeding wads to said carrier intermediately of said plungers and said chambers, means for actuating said plungers toward the latter so as to feed such wads into same, means for pneumatically ejecting such wads from said chamber, said plungers being movable to subsequently eject the rejected wads from such chambers.

9. In a wad-testing device, the combination of a wad-carrier having a series of testing-chambers, a series of plungers mounted upon the latter opposite said chambers, means for feeding wads to said carrier intermediately of said plungers and said chambers, means for actuating said plungers to feed such wads into said chambers, pneumatic means for withdrawing such wads from said chambers, said plungers being movable to subsequently eject the rejected wads from the chambers, the feeding and several ejecting operations being operated at successive points in the movement of the carrier.

10. In a wad-testing device, the combination of a wad-carrier having a series of testing-chambers, a series of plungers mounted upon the latter opposite said chambers, means for feeding wads to said carrier intermediately of said plungers and chambers, means for actuating said plunger to feed such wads into said chambers, pneumatic means for withdrawing such wads from said chambers and means for actuating said plungers to subsequently eject the rejected wads from said chambers.

11. In a wad-testing device, the combination of a wad-carrier having a series of testing-chambers, a series of plungers mounted upon the latter opposite said chambers, means for feeding wads to said carrier intermediately of said plungers and chambers, means for actuating said plunger to feed such wads into said chambers, pneumatic means for withdrawing such wads from said chambers and means for actuating said plungers to subsequently eject the rejected wads from said chambers, said plunger, feed-operating, pneumatic-withdrawing and plunger-ejecting operating means located at successive points in the rotation of said carrier.

12. In a wad-testing device, the combination of a wad-carrier having a testing-chamber, means for feeding a wad into such chamber, and means for projecting a pneumatic blast toward said chamber.

13. In a wad-testing device, the combination of a wad-carrier having a testing-chamber, a feed-plunger and means for projecting a pneumatic blast toward said chamber.

14. In a wad-testing device, the combination of a wad-carrier having a testing-chamber, a feed-plunger provided with a longitudinal bore piercing its face, and means adapted to communicate with said bore for creating a pneumatic blast.

Signed by me this 3d day of December, 1900.

WILLIAM L. MORRIS.

Attest:
  D. T. DAVIES,
  A. E. MERKEL.